Patented Oct. 31, 1950

2,527,618

UNITED STATES PATENT OFFICE 2,527,618

GLASS MAKING MATERIALS RESISTANT TO CAKING

Michael J. Bozich, Pittsburgh, Pa.

No Drawing. Application September 29, 1945, Serial No. 619,424

2 Claims. (Cl. 23—59)

This invention relates to the treatment of materials that tend to cake or harden into lumps and masses, to render them resistant to such caking so that they remain permanently free flowing.

Various solid materials tend to cake or to form surface crusts as a result of change in their water content. Thus, hygroscopic materials tend to pick up moisture from the atmosphere, and in consequence to harden, or cake, more or less rapidly, depending upon their affinity for moisture and the degree of humidity to which they are exposed. The same effect may be encountered with efflorescent materials, due to loss of water. The caking of such materials, which is sometimes called "arching," is highly objectionable and may be exemplified by reference to the glass industry.

In modern glass making plants the various batch ingredients are stored in silos from which weighed amounts are fed automatically to conveying means that carry the materials to batch mixers. Serious difficulties are interposed, however, by reason of the caking of such materials as borax and boric acid used in making borosilicate glasses, and sodium nitrate, which is a common glass batch ingredient. Borax and boric acid tend to arch as a result of losing water, while sodium nitrate is hygroscopic. The hardening of such materials in the storage silos makes it necessary to loosen them, or to break the cakes up by some means to permit proper feeding. This result thus interferes with efficient use of modern glass plant equipment. The same difficulty is encountered with various other materials used for various other purposes, i. e., they tend to set up in transportation or during storage, with interference with efficient handling.

A primary object of this invention is to provide a method of treating hygroscopic and efflorescent materials to render them free flowing and resistant to caking, or arching of this type, and which is simple, easily performed, inexpensive, and highly efficient.

A particular object is to provide a method embodying the foregoing advantageous features which is especially applicable to the treatment of glass making raw materials, and which does not objectionably alter their characteristics from the standpoint of glass batch composition.

Still another object is to provide hygroscopic and efflorescent materials in a form in which they remain free flowing and resistant to caking, and particularly glass making raw materials embodying those characteristics and of such composition as to be generally utilizable for the purposes to which they are ordinarily put in making glass.

The invention is predicated upon my discovery that its stated objects are attained by mixing such materials intimately with finely divided pumice. For maximum efficiency I find that the pumice should be subdivided to pass a 325-mesh screen. One pumice that I have found to be particularly suited to the purposes of the invention is sold by the Pumice Corporation of America, Carlsbad, New Mexico.

In the practice of the invention the pumice is mixed intimately with the material that is to be rendered resistant to caking. This may be done by milling the two materials together, or in other ways that will occur to those working in the art. For instance, where automatic unloading equipment is used for moving material from a railway car to a storage bin, measured amounts of the finely divided pumice may be introduced into the stream of material as it passes into the bin, the swirling and general movement of the two streams producing adequately the necessary intimate admixture. It will be understood also, that although the admixture with pumice may be effected at the works where such materials are received and used, it will be particularly desirable to practice the method of the invention at the source where the materials are produced because thereby caking during transportation or intermediate storage is avoided because the material is permanently free flowing from the time it is produced.

Precise limits for the amount of pumice needed can not be set for all materials because obviously that will depend upon the hygroscopicity or efflorescent tendency of particular materials, as well as upon prevailing humidity conditions. By way of example, however, I find that in the case of such glass making materials as borax, boric acid and sodium nitrate the addition of 1.5 per cent by weight of pumice suffices to keep them permanently free flowing under all conditions of humidity normally encountered throughout the year. Smaller amounts may be used with such materials, if desired, where the humidity conditions render that permissible. Thus, with the materials just named as little as 0.25 per cent by weight suffices to keep them free flowing during winter weather.

Such small amounts of pumice will not ordinarily interfere with many or most uses to which these materials are put. For example, the pumice is not objectionable for most glass making purposes because it consists predominantly of silica, which is used in making all glasses, and most of the remainder is commonly alumina, which is likewise an ingredient of many glasses, or which will be present in such minute amounts as not to impair the quality of other glasses.

Experience has shown that materials treated in accordance with the invention are rendered free flowing and non-caking for indefinitely long periods of time under all normal variations of atmospheric humidity.

Although reference has been made above to specific glass making raw materials, it will be understood that this is only by way of example and that the invention is not restricted thereto but is applicable generally to the field indicated.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of preventing caking during storage of a glass making material of the group consisting of borax, boric acid and sodium nitrate which consists essentially in mixing said material intimately with approximately 0.25 to 1.5 per cent by weight of pumice subdivided to pass a 325-mesh screen, said pumice maintaining said material free-flowing during storage.

2. As a new composition of matter, an intimate mixture of a glass making material of the group consisting of borax, boric acid and sodium nitrate, and from approximately 0.25 to 1.5 per cent by weight of pumice subdivided to pass a 325-mesh screen, the mixture being free flowing and resistant to caking.

MICHAEL J. BOZICH.

REFERENCES CITED

The following references are of record in the file of this patent:

UNITED STATES PATENTS

| Number | Name | Date |
|---|---|---|
| Re. 19,372 | Walton | Nov. 13, 1934 |
| 1,135,787 | Messerschmitt | Apr. 13, 1915 |
| 1,316,071 | Zukoski | Sept. 16, 1919 |
| 1,932,434 | Wyler | Oct. 31, 1933 |
| 1,939,165 | Eissnir | Dec. 12, 1933 |
| 2,008,469 | Prince | July 16, 1935 |
| 2,366,473 | Bair | Jan. 2, 1945 |
| 2,399,987 | Cordie et al. | May 7, 1946 |
| 2,407,151 | Glogau | Sept. 3, 1946 |

FOREIGN PATENTS

| Number | Country | Date |
|---|---|---|
| 367,654 | Great Britain | Feb. 25, 1932 |

OTHER REFERENCES

"Hackh's Chemical Dictionary," 2nd edition, 1938, page 764.

Certificate of Correction

Patent No. 2,527,618 October 31, 1950

MICHAEL J. BOZICH

It is hereby certified that error appears in the printed specification of the above numbered patent requiring correction as follows:

Column 4, line 17, list of references cited, for the patent number "1,135,787" read *1,135,387*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*